United States Patent Office 3,657,317
Patented Apr. 18, 1972

3,657,317
1,3-FUNCTIONALLY DISUBSTITUTED BICYCLOBUTANES
Charles Eugene Coffey, Brandywood, Wilmington, Del., assignor to E. I. du Pont de Nemours and Company, Wilmington, Del.
No Drawing. Filed June 5, 1967, Ser. No. 643,339
Int. Cl. C07c 61/12, 69/74
U.S. Cl. 260—468 B
13 Claims

ABSTRACT OF THE DISCLOSURE

This invention relates to 1.3-functionally disubstituted bicyclobutanes, to a process for their manufacture, and to homopolymers obtainable therefrom.

BACKGROUND OF THE INVENTION

Recent interest in substituted bicyclobutanes has been stimulated by the discovery of their utility as intermediates and additives in the manufacture of various polyesters and polyamides. Research in this field has disclosed various substituted bicyclic compounds including some having functional substituent groups. While functionally disubstituted bicyclobutane compounds have also been disclosed, the particular 1,3-functionally disubstituted compounds wherein functional groups are attached at both bridgehead carbon atoms have been heretofore unknown.

SUMMARY OF THE INVENTION

The instant invention provides compounds of the general formula:

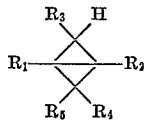

wherein $R_1$ and $R_2$ each are selected from carboxy, lower-alkyl carboxylates including cycloalkyl carboxylates, hydroxymethyl, aminomethyl, carbamoyl, chloroformyl, and cyano, and wherein $R_3$, $R_4$, and $R_5$ are selected from hydrogen and hydrocarbyl groups of from 1 to 18 carbon atoms which are free of aliphatic carbon-to-carbon unsaturation.

This invention further provides a process for the preparation of these compounds. This process comprises contacting a compound of the general formula:

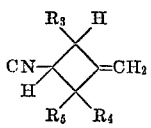

(wherein $R_3$, $R_4$, and $R_5$ are defined as above) with $N_2O_4$ and contacting the product with water; hydrolyzing the resulting 1-cyano-3-hydroxy-3-nitromethylcyclobutane with water and a strong mineral acid; esterifying the resulting 1,3-dicarboxy-3-hydroxycyclobutane with a lower alkanol in the presence of an acid catalyst; halogenating the resulting product to form a 1,3-bis(lower alkoxy carbonyl)-3-halocyclobutane and dehydrohalogenating to form the bicyclo[1.1.0]butane 1,3-dicarboxylate. This carboxylate can then be treated according to methods such as those shown in copending, coassigned application S.N. 622,937, now abandoned e.g., amidation with ammonium hydroxide, dehydration, nitration, and reduction, to yield bicyclobutane compounds with different functional substituent groups. This invention further relates to homopolymers having the recurring structural unit

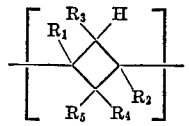

wherein $R_1$, $R_2$, $R_3$, $R_4$, and $R_5$ are as defined above. The term "lower," when used in the definitions, denotes a carbon length of 1–6 carbon atoms.

This invention also provides certain novel intermediate compounds of the above process having the general formula

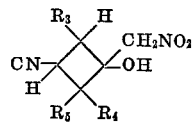

wherein $R_3$, $R_4$, and $R_5$ are defined as above.

DESCRIPTION OF THE PREFERRED EMBODIMENTS

The starting material for the process of the instant invention is selected from compounds of the general formula:

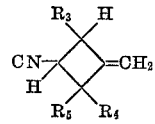

wherein $R_3$, $R_4$, and $R_5$ can be hydrogen or hydrocarbyl groups of from 1 to 18 carbon atoms which are free of aliphatic carbon-to-carbon unsaturation. These compounds can be prepared by reaction of an allene with a 1-cyano-1H-olefin.

Illustrative hydrocarbyl groups included within the present invention are alkyl groups such as methyl, ethyl, tertiary butyl, hexyl, isooctyl, dodecyl and octadecyl; cycloalkyl groups such as cyclopropyl, cyclobutyl, cyclopentyl, cyclohexyl, cyclooctyl, methylcyclohexyl, 3,5-dicyclohexylcyclohexyl and cyclooctadecyl; aryl groups such as phenyl, naphthyl, anthryl, p-biphenylyl, p,p'-triphenylyl, naphthacenyl, benzathryl and chrysenyl; alkaryl groups such as p-tolyl, p-cumenyl, 2,4,6-tributylphenyl, 9,10-diethyl-1-anthryl and 6-methyl-2-naphthyl; and aralkyl groups such as benzyl, phenylethyl, diphenylmethyl, α-naphthylethyl, 2-(2-anthryl)ethyl and 4-(2-anthryl)butyl.

This starting material is first contacted with dinitrogen tetroxide preferably in the presence of a solvent. Suitable solvents can include, for example, halogenated hydrocarbons such as methylene chloride; per-halohydrocarbons such as hexafluoroethane, trichlorotrifluoroethane, and carbon tetrachloride; acids such as acetic acid; ethers such as ethylene glycol dimethyl ether and ethyl ether. The nitration is preferably carried out at a temperature of above 25° C. and generally proceeds most satisfactorily when the reaction mixture is maintained at reflux at atmospheric pressure, but preferably not at temperatures greater than 150° C. The time necessary for completion of the reaction is generally about from 1 to 3 hours, and varies according to the particular solvent selected, amount of reactants, temperature, and other reaction conditions. The product is then contacted with water to yield a 1-cyano-3-hydroxy-3-nitromethylcyclobutane.

This product is then contacted with water and a strong mineral acid such as hydrochloric or sulfuric acid. The amount of acid used is not critical to the process of this invention; however, quantities of about 5–50 times the weight of the nitrated compound are preferred in this process. The reaction temperatures can vary between 0–200° C., a temperature within the range of 50–150° C. being particularly preferred. The reaction time for the completion of the reaction is generally between 1 and 48 hours, 16 hours being sufficient in most cases. The resulting product is a 1,3-dicarboxy-3-hydroxycyclobutane.

This diacid is then contacted with an alkanol of from 1–6 carbon atoms to produce the corresponding ester. The alcohol is generally supplied in quantities of about from 2–100 parts by weight of the alcohol per part of the diacid. To facilitate the esterification, small quantities of a strong mineral acid are added to the reaction mixture. The esterification is usually complete within a period of from about 6 to 48 hours. The reaction temperature can vary between 0–200° C., a temperature within the range of 50–150° C. being particularly preferred. The ester reaction product can then be halogenated to the corresponding 1,3-bis(alkoxy-carbonyl-3-halocyclobutane. This may be facilitated by contacting the previous product with a halogen containing compound such as thionyl chloride, phosphorous trichloride, phosphorous tribromide, or hydrobromic acid. This halo compound is then dehydrohalogenated to form the bridge-bond between the 1- and 3-carbon atoms. This can be effected, for example, by contacting the halogenated product with bases such as sodium methoxide, sodium hydroxide, sodium hydride, and sodium tertbutoxide.

The bridge-head substituted diesters can be converted to the corresponding dicarbamoyl compound by contacting them with an ammonia solution. An aqueous solution of ammonium hydroxide having a concentration of about from 10 to 30% (saturated) of ammonium hydroxide is preferred. This amidation can be effected at room temperature or at moderately elevated temperatures, and the reaction is generally completed in a period of from 1–20 hours. The pressure during the course of the reaction is preferably maintained at about from 1 to 3 atmospheres. The diamide product is generally present as a precipitate in the reaction vessel and can be readily isolated by a removal of the solvent, e.g., by filtration or decantation. If desired, the crude product can then be further purified by recrystallization from water.

This diamide can be dehydrated to the corresponding dinitrile with a dehydrating reagent, for example, thionyl halides such as thionyl chloride or thionyl bromide, phosphorous oxychloride, and acetyl chloride, of which thionyl chloride is preferred. The dehydration can also be accomplished with heat and a solid catalyst such as alumina. This reaction is most effective when conducted under moderately elevated temperatures, e.g., 25–100° C., and is generally completed after a period of refluxing for 1 to 15 hours.

The dicyano compound can also be obtained by formation of a 1,3-dicyano cyclobutane, illustrated in copending, coassigned application S.N. 622,837, by the amidation and dehydration of 1,3-cyclobutanedicarboxylate, and forming the 1,3 bond by a method similar to that of the instant invention. Such a synthesis is shown in Example 4 of the instant specification.

The dicyano compound can be catalytically hydrogenated to the 1,3-bis(aminomethyl)cyclobutane by the use of hydrogen in conjunction with a catalyst, for example, the nobel metal catalysts such as platinum, palladium, rhodium, Raney nickel and rhodium-on-nickel catalysts. The solvents for this hydrogenation can include, for example, alcohols of from 1–4 carbon atoms, such as methanol and ethanol, chlorinated hydrocarbons such as methylene chloride, hexachlorobenzene, and trichlorotrifluoroethane, and ethers such as isopropyl ether, n-butyl ether, and ethyl ether; of these, ethanol is particularly preferred because of its ready availability and nonreactivity with the products and reagents. The addition of ammonia to the reaction mixture is preferred to avoid possible side reactions. The hydrogenation is preferably conducted at elevated temperatures and pressures. Pressures of from 1 to 10,000 p.s.i.g. and temperatures of from 100 to 200° C. have been found particularly effective. The hydrogenation reaction is generally completed within about from 1 to 10 hours. The resulting product can then be purified by methods well known to those skilled in the art, for example, removal of the excess solvent by distillation and a further purification distillation of the remaining product. Alternatively, reduction to the diamine can be effected through the use of LiAlH$_4$.

The ester substituent can be changed by contacting the 1,3-bis-(alkoxy carbonyl)bicyclo[1.1.0]butane with an alcohol such as a lower alkanol, e.g., ethanol, butanol, propanol, or a cycloalkanol such as cyclohexanol, in the presence of a catalyst.

The difunctionally substituted bicyclobutane products of this invention can be polymerized by the standard methods of polymerization known to those skilled in the art. For example, the compounds can be polymerized in bulk by the simple addition of a suitable catalyst such as di-tertiarybutylperoxide or azo-bis-isobutyronitrile or can be treated by dispersion, emulsion, or solution methods through free-radical polymerization. Suitable solvents for the latter three types of polymerization include water, hydrocarbons such as benzene or hexane, chlorinated aromatic hydrocarbons such as chlorobenzene, nitriles such as acetonitriles, amides such as dimethylformamide and N-methyl-pyrrolidone, and sulfoxides such as tetramethylenesulfoxide.

The free radical-generating initiators which can be used in each of these polymerizations can be selected from a wide variety of compounds representative of this type of initiator, including, for example, azo initiators such as, $\alpha,\alpha'$-azodiisobutyronitrile, 1,1'-azodicyclohexanecarbonitrile, dimethyl $\alpha,\alpha'$-azodiisobutyrate and $\alpha,\alpha'$-azodiisobutyramide, and organic peroxides and hydroperoxides such as dibenzoyl peroxide, di-t-butyl peroxide, and t-butyl hydroperoxide. These initiators may be used in concentrations ranging from about 0.01 to 10 percent by weight of the bicyclobutane monomer to be polymerized. Other free radical sources for polymerization initiation can be also used, such as electron bombardment and ultraviolet light in the presence of a sensitizer.

Reaction times for preparing the homopolymers from the bicyclobutane monomers described above may vary from approximately a few seconds (e.g., 5 sec.) to several days, for example, two or three days depending on the particular monomer used, the initiator, the solvent system, and the reaction temperature employed.

These polymerizations can be carried out at ambient temperatures and pressures. However, moderately elevated temperatures, e.g., up to about 160° C. and pressure up to about 2 atmospheres are preferred for these reactions.

The novel homopolymers discolsed in this invention, as indicated, are useful in the formation of films and fibers. The disubstituted bicyclobutane monomers, in addition to their use in the formation of the polymers described above, are useful as chain extenders in the formation of copolymers and may be reacted with olefins to form copolymers by a free-radical polymerization mechanism as disclosed in the copending, coassigned application S.N. 601,325. The 1,3-difunctional substituent groups render these compounds especially useful as intermediates in a broad range of chemical syntheses.

In the following examples, which further illustrate the instant invention, parts and percentages are by weight unless otherwise noted.

Example 1

Part A: 1-cyano-3-hydroxy - 3 - nitromethylcyclobutane.—93 parts of 1-cyano-3-methylenecyclobutane are dissolved in about 4000 parts of methylene chloride. This mixture is brought to reflux temperature, and 93 parts of $N_2O_4$, previously dissolved in about 1300 parts of methylene chloride, are added dropwise to the refluxing mixture. The reaction mixture is then partially distilled to remove excess $N_2O_4$, then 18 parts of $H_2O$ are added dropwise to the remaining mixture. The solution is then dried over a neutral drying agent, $Na_2SO_4$. The dried solution is then distilled under reduced pressure to remove excess solvent. A viscous oil remaining contains the two isomers of the title compound in isomeric mixture.

The structure of this compound is verified to be 1-cyano-3-hydroxy-3-nitromethylcyclobutane by IR spectrum and its thermal decomposition to 3-cyanocyclobutanone and nitromethane.

Part B: 1,3-dicarboxy-3-hydroxycyclobutane.—The reaction product from Part A, without further purification, is hydrolyzed in aqueous boiling hydrochloric acid for several hours. The hydrolysate is concentrated by removal of the aqueous phase by distillation at reduced pressure. The mixture that remains consists of the cis and trans isomers of the desired product, 1,3-dicarboxy-3-hydroxycyclobutane, as well as 3-ketocyclobutane carboxylic acid together with lesser amounts of both isomers of 1-chloro-1,3-dicarboxyclobutane and 1-hydroxy-1-nitromethyl-3-carboxycyclobutane. Ammonium chloride and hydroxylammonium chloride are also present as hydrolysis byproducts.

The organic acids are separated from the inorganic products by repeated and continuous extraction with diethyl ether. The ether extract is then distilled to remove the solvent, to leave the desired acid products.

Part C: 1,3-bis(methoxycarbonyl) - 3 - hydroxycyclobutane.—The acids resulting from Part B are esterified by refluxing them with methanol in the presence of sulfuric acid. The resulting reaction mixture is then concentrated to remove most of the alcohol. The cold acidic solution is diluted with water and extracted repeated with diethyl ether. The ether extract is washed with aqueous sodium bicarbonate and then dried over sodium sulfate. The ether is then removed by distillation.

The extract is then subjected to fractional distillation on an efficient column at reduced pressure to produce the title compound, as a mixture of cis and trans isomers, and 3-methoxycarbonylcyclobutanone. The esters were isolated by vapor phase chromatography, and their structures verified by NMR, mass and IR spectra. The boiling point of the title esters at 2 mm Hg is 105–106° C.

Part D: 1,3-bis(methoxycarbonyl) - 3 - chlorocyclobutane.—90 parts of 1,3-bis(methoxycarbonyl)-3-hydroxycyclobutane are mixed with 40 parts of pyridine. This mixture is cooled in ice, and then 60.7 parts of thionyl chloride ($SOCl_2$) are added dropwise. The semisolid mass that results is warmed at 60° C. for 1.5 hours and then further heated on a steam bath for 0.5 hour. After cooling, 100 parts of ether are then added to the reaction mixture, which is then further cooled in ice. The cooled ether solution is decanted from the resulting crystalline solid. This solid is extracted about three times with 50–100 parts of ether. The combined ether extracts are washed twice with water, dried over a neutral drying agent like sodium sulfate, and distilled to yield 1,3-bis-(methoxycarbonyl)-3-chlorocyclobutane in relatively pure form. The boiling point at 1 mm. Hg pressure is 72° C., and the structure was verified by IR, NMR, and mass spectra and by chemical analysis.

Part E: 1,3 - bis(methoxycarbonyl)bicyclo[1.1.0]butane.—A solution of 206 parts of 1,3-bis(methoxycarbonyl)-3-chlorocyclobutane in about 300 parts of tetrahydrofuran (THF) is added dropwise to a mixture of about 25 to 30 parts of sodium hydride suspended in about 500 ml. tetrahydrofuran. The reaction mixture is warmed to initiate the reaction. Once initiation occurs, the temperature of the reaction mixture is maintained between 25 to 50° C. by regulation of the addition of the 1,3 - bis(methoxycarbonyl)-3-chlorocyclobutane solution. When hydrogen evolution is complete, 50 parts of an aqueous sodium chloride solution is added to decompose excess sodium hydride. 150 parts of water, with 500 parts of diethyl ether are then added and the ether layer is then separated. This ether layer is washed with water, and the washed layer is dried over $Na_2SO_4$, and the solvent ether removed by distillation. About 150 parts of petroleum ether is added to the remaining extract, and the mixture is cooled in ice to obtain the title compound in crude form. The crude product is further purified by sublimation. The 1,3-bis(methoxycarbonyl)bicyclo[1.1.0]butane melts at 59.5–61.5° C., and the structure is verified by IR spectra, mass spectrographic data, and UV spectrum analysis. The chemical analysis is:

DUPLICATE AVERAGE

| Element | Found | Calculated |
|---------|-------|------------|
| C       | 56.58 | 56.46      |
| H       | 5.82  | 5.92       |

If Example 1 is repeated using like quantities of any of the compounds appearing in column 2, lines 25–38, instead of 1-cyano-3-methylenecyclobutane, the corresponding 2,4-substituted bicyclobutane is obtained.

Example 2.—1,3-dicarboxybicyclo[1.1.0]butane 1.7 parts of 1,3-bis(methoxycarbonyl)bicyclo[1.1.0]butane is dissolved in 40 parts of 10% sodium hydroxide in water. This solution is heated and refluxed for 3 hours. The reaction mixture is then cooled, acidified with hydrochloric acid, and evaporated to dryness. The reaction product is then extracted with diethyl ether and the extract is concentrated by evaporation. The concentrate is taken up in acetone and hexane is added to the mixture cooled to obtain 0.4 g. of the title compound as a white crystalline solid. The structure is confirmed by IR spectral analysis. The chemical analysis for the diacid is:

| Element | Found (average) | Calculated |
|---------|-----------------|------------|
| C       | 50.86           | 50.71      |
| H       | 4.265           | 4.26       |

Example 3.—1,3-dicarbamoylbicyclo[1.1.0]butane 1 part of 1,3-bis(methoxycarbonyl)bicyclobutane is dissolved in 25 parts of aqueous ammonia solution and warmed on a steam bath for 45 minutes. Upon cooling, 0.1 part of the title compound are obtained as white crystals. The structure is confirmed by IR spectral analysis. The chemical analysis is:

| Element | Found (average) | Calculated |
|---------|-----------------|------------|
| C       | 51.70           | 51.43      |
| H       | 6.00            | 5.75       |
| N       | 20.08           | 20.00      |

In a like manner, if the reaction is repeated using a single chemical equivalent of ammonia solution, 1-methoxycarbonyl - 3 - carbamoylbicyclo[1.1.0]butane is obtained.

Example 4

Part A: 1 - chloro - 1,3 - dicyanocyclobutane.—In a 300-ml., 3-neck flask fitted with mechanical stirrer and reflux condenser are placed 35 g. (0.33 mole) of 1,3-dicyanocyclobutane and 70 g. (0.33 mole) of phosphorous pentachloride. The mixture is brought to reflux in an oil bath at 100° for 6 hours, then allowed to stand at room temperature overnight. Most of the phosphorous trichloride product is distilled (B.P. 74° at atmospheric pressure). The residue is distilled under vacuum to give 16.5 g. of colorless liquid and white solid, B.P. 107–114° (2.0 mm.). The NMR spectrum and GC chromatogram show the presence of both isomers of starting material and both isomers of 1,3-dichloro-1,3-dicyanocyclobutane, in addition to the desired product. The product is purified by elution chromatography. A quantity of 10 g. of distilled crude product is dissolved in a minimum amount of benzene and added to a column of 450 g. Florisil. Elution with benzene (50 ml. benzene each fraction) gives as fractions 31–41 pure dichloride (both isomers). Fractions 42–133 contain mixtures of dichloride and the desired monochloride. Fractions 133-ad infinitum contain pure monochloride (both isomers), in which no trace of the starting material is seen, even after eluting for 16 hours with benzene. Fractions 133-ad infinitum are combined to give 3.3 g. of monochloride which is distilled to give 2.75 g. of a mixture of cis- and trans-1-chloro-1,3-dicyano-cyclobutane, as a glassy colorless solid, B.P. 75–80° (0.2 mm.).

*Analysis.*—Calcd. for $C_6H_5N_2Cl$ (percent): C, 51.26; H, 3.59; N, 19.93; Cl, 25.22. Found (percent) C, 51.08, 51.29; H, 3.58, 3.65; N, 19.76, 20.11; Cl, 25.17.

Part B: 1,3 - dicyanobicyclo[1.1.0]butane.—A 250-ml., 3-neck flask fitted with reflux condenser and magnetic stirring bar is flamed out under nitrogen. To the flask are added 2.6 g. (0.0185 mole) of 1-chloro-1,3-cyclobutane-dicarbonitrile and 100 ml. of ether. The solution is stirred in an ice-methanol bath at −10°. To the stirred solution is added 2.5 g. (0.022 mole) of potassium t-butoxide in ten portions over 15 minutes. The reaction mixture is stirred for an additional hour at −10°. To the mixture is added 1.5 g. Dry Ice, 0.4 ml. water, 2 g. of magnesium sulfate, and 200 mg. inhibitor (2,5-di-t-butyl-p-quinone). The mixture is filtered through Celite. The Celite is rinsed several times with ether. The combined filtrate is evaporated to give a white solid. This material is dissolved in chloroform and transferred to a short path distillation setup. Distillation gives 0.95 g. (50%) of 1,3-dicyano-bicyclo[1.1.0]butane in the form of a light yellow solid, B.P. 69° (0.25 mm). Analysis by GC and NMR shows the presence of about 3 mole percent of inhibitor, so that the sample is recrystallized from benzene-petroleum ether to give shiny colorless platelets, M.P. 51.5–52.5°. The UV spectrum exhibits an absorption at 207 m$\mu$ ($\epsilon$ 6800) in acetonitrile. The NMR spectrum exhibits two triplets at 7.27$\tau$ and 8.19$\tau$ (J=1.2 cps., equal integrals).

*Analysis.*—Calcd. for $C_6H_4N_2$ (percent): C, 69.22; H, 3.87; N, 26.91. Found (percent): C, 68.46, 68.55, 68.70, 69.02, 69.06; H, 3.52, 3.58, 3.94, 3.98, 4.10; N, 26.94, 27.08.

Molecular weight calcd: 104. Found: 104 (mass spectrum).

If 1,3-dicyanobicyclo[1.1.0]butane is contacted with $LiAlH_4$ at ambient temperatures and pressure and the product hydrolyzed, 1,3-bis(aminomethyl)bicyclo[1.1.0]butane is obtained.

Example 5.—Slurry polymerization of bis(methoxycarbonyl)bicyclo[1.1.0]butane

A mixture of 4.00 g. of 1,3-bis(methoxycarbonyl) bicyclo[1.1.0]butane, 0.22 g. of dipotassium phosphate, 0.43 g. of a 3% aqueous solution of polymethacrylic acid, and 50 ml. of water is heated to 76° C. While this mixture is stirring, 0.3 ml. of a 0.18 M solution of azobisiso-butyronitrile in methanol is added. After a few minutes of refluxing and stirring, a crust of polymer begins to form which, after 15 minutes, is tough enough to stop the stirrer. The temperature is allowed to rise gradually to 160° C., resulting in evaporation of the solvent and volatile residues. The total reaction time is three hours. The cooled product is broken up in liquid nitrogen, with some mechanical loss, to yield 2.29 g. of white polymer. By differential thermal analysis, the polymer gradually decomposed above 355° C., with a peak at 444° C. The infrared spectrum shows typical ester absorption. The X-ray spectrum indicates moderate crystallinity, the most intense band falling at 10.5° (2$\theta$). The polymer has high molecular weight ($\eta_{inh}$=2.55 in N-methylpyrrolidone-LiCl at 100° C.). The polymer is soluble in N-methyl-pyrrolidone, dimethyl sulfoxide, and chloroform. A 10% solution in N-methylpyrrolidone is cast on glass and dried in a vacuum oven at 80° C., under nitrogen to yield a clear, coherent, reasonably tough film.

In a like manner, if 1,3-dicarbamoylbicyclo[1.1.0]butane is used instead of 1,3-bis(methoxycarbonyl)bicyclo[1.1.0]butane, a polymer is obtained having the general formula

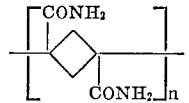

wherein $n$ is a positive integer of about from 5–1000.

Example 6.—Polymerization of bis(methoxycarbonyl)bicyclo[1.1.0]butane in benzene-water To a stirred mixture of 7.5 g. of 1,3-bis(methoxycarbonyl)bicyclo[1.1.0]butane and 0.02 g. of a synthetic dispersing agent in 5 ml. of benzene and 38 ml. of water (degassed) is added 0.05 g. of potassium persulfate and 0.05 g. of sodium bisulfite. The mixture was stirred for two hours, and the same amounts of potassium persulfate and sodium bisulfate are added again. After three more hours of stirring, a thin sheet of polymer has formed on the walls of the reactor. After another 14 hours, there is a thick sheet of polymer which is pulled from the flask. It is washed in a blender with water, methanol, and with water again, and then dried to yield 3.0 g. of white polymer ($\eta_{inh}$=1.24 in N-methyl-pyrrolidone-LiCl at 100° C.). Clear films of the polymer are cast from solutions in N-methylpyrrolidone and dimethyl sulfoxide.

In a like manner, if 1,3-dicyanobicyclo[1.1.0]butane is used instead of the 1,3-bis(methoxycarbonyl)bicyclo-[1.1.0]butane a polymer is obtained having the general formula

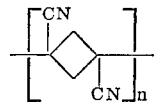

wherein $n$ is a positive integer of about from 5 to 1000.

Example 7.—Bulk polymerization of bis(methoxycarbonyl)bicyclo[1.1.0]butane in benzene water A mixture of 3.76 g. of 1,3-bis(methoxycarbonyl)bi-cyclo[1.1.0]butane and 3.9 mg. of azobisisobutyronitrile is sealed under nitrogen in an NMR tube and agitated in a bath at 65° C. The monomer melts and dissolves the catalyst before polymerization begins. After two hours on the bath, the tube contains a foam of crisp, brittle polymer.

In a like manner, if 1,3-bis(aminomethyl)bicyclo-[1.1.0]butane is used instead of the 1,3-bis(carbonyl)bi-cyclo[1.1.0]butane a polymer is obtained having the general formula

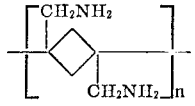

wherein $n$ is a positive integer of about from 5 to 1000.

Example 8.—Bulk polymerization of bis(methoxycarbonyl)bicyclo[1.1.0]butane in benzene-water The procedure of Example 7 is repeated using a mixture of 3.0 g. of 1,3-bis(methoxycarbonyl)bicyclo[1.1.0]butane and 37.3 mg. of ditertiarybutyl peroxide catalyst. After one hour in the bath, the tube contains a tough, sparkling, clear block polymer.

In a like manner, if 1,3-dicarboxybicyclo[1.1.0]butane is used instead of the 1,3-bis(methoxycarbonyl)bicyclo-[1.1.0]butane a polymer is obtained having the general formula

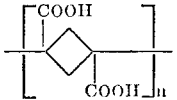

wherein $n$ is a positive integer of about from 5 to 1000.

I claim:
1. A compound of the general formula:

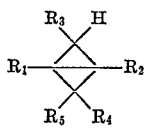

wherein $R_1$ and $R_2$ each are selected from carboxy, loweralkyl carboxylates or cycloalkyl carboxylates, and wherein $R_3$, $R_4$, and $R_5$ and selected from hydrogen and hydrocarbyl groups of 1 to 18 carbon atoms which are free of aliphatic carbon-to-carbon unsaturation.

2. A compound of claim 1 wherein $R_3$, $R_4$, and $R_5$ are all hydrogen.

3. A compound of claim 2 wherein $R_1$ and $R_2$ are both $CO_2H$.

4. A compound of claim 2 wherein $R_1$ and $R_2$ are both $CO_2CH_3$.

5. A process which comprises the steps of contacting a compound of the general formula:

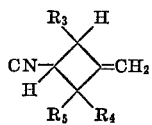

wherein $R_3$, $R_4$ and $R_5$ are selected from hydrogen and hydrocarbyl groups of from 1 to 18 carbon atoms free of aliphatic carbon-to-carbon unsaturation, (1) with dinitrogen tetroxide in the presence of a solvent and at a temperature of 25-150° C. and thence water to form 1-cyano-3-hydroxy-3-nitromethylcyclobutane, (2) hydrolyzing the product of step 1 with water and a strong mineral acid at a temperature of 0-200° C. and an acid quantity of about 5-50 times the weight of the step 1 product to form a 1,3-dicarboxy-3-hydroxycyclobutane, (3) esterifying the product of step 2 with a lower alkanol of from 1-6 carbon atoms in the presence of a strong mineral acid catalyst at a temperature of 0-200° C., (4) halogenating the product of step 3 to form a 1,3-bis(lower alkoxycarbonyl)-3-halocyclobutane and (5) dehydrohalogenating the product of step 4 by contacting it with a base to form a 1,3-bicyclo[1.1.0]butane dicarboxylate.

6. A process of claim 5 wherein $R_3$, $R_4$, and $R_5$ are hydrogen.

7. A process of claim 5 wherein said 1-cyano-3-methylenecyclobutane is contacted with dinitrogen tetroxide in the presence of a halogenated hydrocarbon solvent.

8. A process of claim 7 wherein said solvent is methylene chloride.

9. A process of claim 8 wherein said strong mineral acid is hydrochloric acid.

10. A process of claim 9 wherein said lower alkanol is methanol and said acid catalyst is sulfuric acid.

11. A process of claim 10 wherein said halogenation is effected by contacting said product with pyridine and thionyl chloride.

12. A process of claim 11 wherein said dehydrohalogenation is effected by contacting said product with sodium hydride suspended in tetrahydrofuran.

13. A process for the production of a compound of the formula:

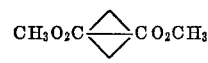

which process comprises contacting 1-cyano-3-methylenecyclobutane with dinitrogen tetroxide in the presence of methylene chloride, contacting the product with water, contacting the resulting product with an aqueous acid selected from hydrochloric and sulfuric acid at a temperature of about from 50 to 150° C., contacting the resulting product with methanol in the presence of an acid such as sulfuric acid or hydrochloric acid, contacting the resulting product with thionyl chloride in the presence of pyridine and contacting the resulting product with sodium hydride suspended in tetrahydrofuran to yield 1,3-bis-(methoxycarbonyl)bicyclo[1.1.0]butane.

References Cited
UNITED STATES PATENTS 3,234,264    2/1966    Blanchard _____ 260—464

OTHER REFERENCES

Franck-Neumann; Angew. Chem. 79, 98, 1967.

LORRAINE A. WEINBERGER, Primary Examiner

R. GERSTL, Assistant Examiner

U.S. Cl. X.R.

260—2 R, 78.4 R, 78.4 N, 464, 465 B, 465 F, 465 G, 465 H, 468 R, 473 R, 475 SC, 514 R, 515 A, 515 B, 515 A, 515 P, 520, 544 L, 544 M, 557 B, 558 R, 563 P, 570.5 P, 617 F, 618 F